United States Patent
Herding

[11] Patent Number: 5,874,000
[45] Date of Patent: Feb. 23, 1999

[54] FIBRE-COATED FILTER ELEMENT

[75] Inventor: Walter Herding, Hahnbach, Germany

[73] Assignee: Herding GmbH Filtertechnik, Amberg, Germany

[21] Appl. No.: 737,783

[22] PCT Filed: May 23, 1995

[86] PCT No.: PCT/EP95/01990

§ 371 Date: Feb. 19, 1997

§ 102(e) Date: Feb. 19, 1997

[87] PCT Pub. No.: WO95/32047

PCT Pub. Date: Nov. 30, 1995

[30] Foreign Application Priority Data

May 24, 1994 [DE] Germany ............ 44 18 033.0

[51] Int. Cl.$^6$ .................. B01D 24/00; B01D 39/02
[52] U.S. Cl. ............ 210/490; 210/505; 210/510.1
[58] Field of Search ................. 210/489, 490, 210/505, 510.1

[56] References Cited

U.S. PATENT DOCUMENTS

| | | | |
|---|---|---|---|
| 5,290,449 | 3/1994 | Haegle et al. | 210/503 |
| 5,552,049 | 9/1996 | Gray | 210/510.1 |
| 5,591,335 | 1/1997 | Barboza et al. | 210/323.2 |
| 5,681,469 | 10/1997 | Barboza et al. | 210/503 |

Primary Examiner—David A. Reifsnyder
Attorney, Agent, or Firm—Venable; George H. Spencer

[57] ABSTRACT

A filter element comprising an inherently stable, porous supporting body with a finer-pored fibrous coating. According to a first aspect, the fibrous coating has first fibers which are longer than the pore size of the supporting body, and clearly shorter second fibers. According to a second aspect, less than 30% fine-grained particles are distributed in the fibrous coating. To produce the filter element the fibers are applied in the dry state by means of an air stream, an adhesive being applied before and/or after this operation. Alternatively the fibers are applied distributed in a liquid, whereby the adhesive can optionally be contained in the liquid. According to a further aspect, a coating layer consisting of fine-grained particles is applied to the fibrous coating.

10 Claims, 1 Drawing Sheet

FIBRE-COATED FILTER ELEMENT

This invention relates to a filter element having an inherently stable, porous supporting body and, on its afflux surface for fluid to be filtered, a fibrous coating of the supporting body which is finer-pored than the supporting body, the fibrous coating being bound to the supporting body in part by a fiber/fiber bond and in part by a fiber/supporting body bond.

In a known filter element of this type (WO 87/01610) the fibrous coating consists of fibers which are considerably longer than the average pore size of the supporting body, and fine-grain particles distributed in the fibrous coating and bound to the fibers. During the work in connection with this invention, however, it was found that such a filter element with high fine filtering ability can be created only if the fibrous coating is rather thick; this increases the pressure loss which the medium to be filtered suffers when flowing through the filter element.

The invention is based on the problem of providing a filter element of the abovementioned type which is characterized by a good compromise between the particular degree of fine filtering ability desired and a low pressure loss for the medium to be filtered flowing through the filter element. Methods are furthermore to be provided for producing such filter elements.

Several solutions to this problem are described in the following.

According to a first aspect of the invention the filter element is characterized in that the fibrous coating has first fibers whose length is greater than the average pore size of the supporting body, and second fibers whose length is clearly smaller than the length of the first fibers to create the fine porosity of the fibrous coating.

This realizes the principle of filling or covering the spaces between the first fibers with the shorter second fibers.

The first fibers generally have a length which is clearly greater than the average pore size of the supporting body, in particular more than twice as great as the average pore size of the supporting body. The second fibers generally have a length smaller than the average pore size of the supporting body, in particular less than half the average pore size of the supporting body. The fibrous coating preferably contains more second fibers than first fibers (measured as part by weight), the weight ratio of second fibers to first fibers especially preferably being greater than 2:1. The first fibers and second fibers are preferably fibers made of the same material and/or fibers of approximately the same diameter class. It is frequently sufficient if less than 10% by weight of the fibrous coating is first fibers.

According to a second aspect of the invention the filter element is characterized in that any fine-grained particles distributed in the fibrous coating are contained with under 30% by weight, preferably under 20% by weight, more preferably under 10% by weight, most preferably 0 to 3% by weight, based on the total weight of fibers and fine-grained particles.

This goes in a direction contrary to the relevant prior art (WO 87/01610) in that one very considerably reduces the proportion of fine-grained particles distributed in the fibrous coating, in extreme cases even to zero or near zero. The desired degree of fine filtering ability is thus provided essentially by the fibers and not by fine-grained particles distributed in the fibrous coating. In the second aspect of the invention the described first fibers and the described second fibers need not be present, but they can be.

The invention can be realized with filter elements made of a multitude of materials. As far the supporting body is concerned, plastic or synthetic resin materials, ceramic materials and metallic materials are especially pointed out. To produce the porous supporting body efficiently one can sinter particles of the stated materials together or interconnect them by other bonding mechanisms, e.g. using a binder. As far the material of the fibers is concerned, ceramic fibers are preferred, in particular from aluminum silicate. However one can also use other fibers, e.g. glass fibers, natural fibers, synthetic organic fibers, etc. For producing the fiber/fiber bond and the fiber/supporting body bond there are a great number of possibilities, in particular sintering, using an adhesive or binder, etc.

The first fibers are preferably applied as a first fibrous coating layer and the second fibers applied thereto as a second coating layer. In this case the second fibers frequently penetrate in part into the spaces between the first fibers of the first fibrous coating layer, so that there is no longer a clear boundary between the first and second fibrous coating layers in the finished state. Alternatively it is possible to apply the first fibers and second fibers mixed together in one step.

A plurality of fibrous coating layers are preferably applied with the fineness of porosity increasing away from the supporting body. This design of the filter element is also realized by the fibrous coating mentioned in the last paragraph having a first fibrous coating layer and second fibrous coating layer. The possibility of design in question now, however, aims at applying at least one further fibrous coating layer with a finer porosity to the first fibrous coating (having first and second fibers, whether in one common coating layer or in two successively applied coating layers). This is preferably done using fibers which are shorter and/or thinner than in the first fibrous coating, optionally also using fibers made of a different material. The at least one further fibrous coating layer need normally no longer have first fibers and second fibers; the first fibrous coating located thereunder is an ideal base for applying the at least one further fibrous coating layer.

In a preferred embodiment of the invention the filter element has a coating layer consisting of fine-grained particles on the outside on the fibrous coating. These particles are preferably so small that this coating layer essentially determines the fine filtering ability of the filter element. For the fine-grained particles there is a broad choice of materials; they can be in particular plastic particles or inorganic particles. An especially preferred choice will be mentioned more specifically below. The fine-grained particles can be bound together and to the fibrous coating in the way described above for the bond of the supporting body particles and the fibrous coating fiber/fiber bond or fiber/supporting body bond.

It is pointed out that the application of a coating layer consisting of fine-grained particles to a fibrous coating is, on the one hand, a preferred development of the first and/or second aspect of the invention. On the other hand, it is also an independent invention which is advantageously realizable without the presence of first fibers and second fibers and/or without minimizing the proportion of fine-grained particles distributed in the fibrous coating.

A further subject of the invention is a method for producing a filter element having an inherently stable, porous supporting body and, on its afflux surface for fluid to be filtered, a fibrous coating of the supporting body which is finer-pored than the supporting body, the fibrous coating being bound to the supporting body in part by a fiber/fiber bond and in part by a fiber/supporting body bond, characterized in that the fibers for forming the fibrous coating are applied to the afflux surface of the supporting body in the dry state, preferably by means of an air stream, whereby an adhesive has been previously applied to the afflux surface, and/or is applied after application of at least part of the fibers, to create the fiber/fiber bond and the fiber/supporting body bond.

If adhesive is applied before the fibers, the applied fibers stick to the supporting body with the aid of the adhesive. On the other hand, since the fibers have a tendency toward a certain mutual coherence so that they stick to the supporting body temporarily even without adhesive, it is also possible to apply the adhesive subsequently.

Yet another subject of the invention is a method for producing a filter element having an inherently stable, porous supporting body and, on its afflux surface for fluid to be filtered, a fibrous coating of the supporting body which is finer-pored than the supporting body, the fibrous coating being bound to the supporting body in part by a fiber/fiber bond and in part by a fiber/supporting body bond, characterized in that the fibers for forming the fibrous coating are applied to the afflux surface of the supporting body dispersed or suspended in a liquid, whereby an adhesive has been previously applied to the afflux surface, and/or is applied after application of at least part of the fibers, and/or is contained in the carrier liquid, to create the fiber/fiber bond and the fiber/supporting body bond.

As opposed to the method outlined above, the fibers are thus applied virtually in the wet state, which is especially efficient in many cases. Especially suitable simple ways of applying the fibers-in-liquid dispersion or suspension are to spray, spread or roll it on, or to immerse the supporting body in the dispersion or suspension.

It is pointed out that the term "adhesive" is to be understood in a very extensive sense according to the invention. It includes all materials which make the fibers stick together and to the supporting body firmly enough for operation of the filter element, in particular adhesives in the narrower sense, plastics or synthetic resins capable of producing the stated bond, organic or inorganic binders such as soda water glass. It is explicitly pointed out that the inventive methods can alternatively use other fiber/fiber and fiber/supporting body bonding mechanisms, in particular sintering. Obviously the adhesive or binder is selected and used in a quantity such that the functionally necessary pores or flow passages between the fibers are not sealed.

As mentioned above, a plurality of fibrous coating layers are preferably applied with the fineness of porosity increasing away from the supporting body, being normally applied successively. Each of the fibrous coating layers can be applied by one of the inventive methods described.

Yet another subject of the invention is a method for producing a filter element having an inherently stable, porous supporting body and, on its afflux surface for fluid to be filtered, a fibrous coating of the supporting body which is finer-pored than the supporting body, the fibrous coating being bound to the supporting body in part by a fiber/fiber bond and in part a by fiber/supporting body bond, characterized in that a coating layer consisting of fine-grained particles is applied to the fibrous coating.

Further information on this coating layer consisting of fine-grained particles has been provided above.

In a further embodiment of the invention the coating layer consisting of fine-grained particles is applied using particles which are to be filtered out of a fluid stream in the intended operational use of the filter element. If one wants to use an inventive filter element for removing the rock dust arising during operation of a crushing plant, for example, one can use this rock dust, which has been filtered out e.g. by any filter, for producing the coating layer of fine-grained particles when producing an inventive filter element.

In a further embodiment of the invention one applies the fibers and/or fine-grained particles using a suction air stream away from the afflux surface of the supporting body through the latter. The suction air stream conducts the fibers and/or fine-grained particles specifically to where they are to form the fibrous coating.

Use of a suction air stream provides the preferred possibility of detecting the concentration and/or size of entrained foreign matter particles in the suction air stream after it has passed the supporting body, and ending application of the fibers and/or fine-grained particles in accordance with this detection, in particular as soon as the concentration and/or size of the foreign matter particles contained after the supporting body has fallen below a certain threshold value. One can thus produce filter elements with a separation efficiency or separation fineness virtually made to measure, e.g. in accordance with the filtering task the filter element in question is intended to perform. If the concentration of foreign matter particles after the supporting body is detected, it can also be compared to the detected concentration of entrained foreign matter particles before the afflux to the filter element.

An especially favorable possibility is to perform the described detection of the concentration and/or size of entrained foreign matter particles if applying a coating layer consisting of fine-grained particles using particles which are to be filtered out of a fluid stream in the intended operational use of the filter element. This leads in perfect fashion to a filter element having a separation fineness made to measure (with the required separation fineness reliably reached but not unnecessarily high), thereby avoiding production of a filter element with excessive pressure loss. If the particles used for the coating layer of fine-grained particles are ones to be filtered out of a fluid stream in the intended operational use of the filter element, one is perfectly right with the detection of the concentration and/or size of entrained foreign matter particles (e.g. detected as less than × mg foreign matter particles with a size under 1 micron remaining per $m^3$ filtered air) because one has stopped application of the coating layer exactly when it has the necessary thickness.

It is pointed out that the principle outlined in the last paragraph has an importance going beyond application of the coating layer of fine-grained particles to a fibrous coating, and can be realized regardless of whether or not a fibrous coating is present on the supporting body under this coating layer of fine-grained particles.

Instead of detecting the concentration and/or size of entrained foreign matter particles after the supporting body, or in addition thereto, one can detect the pressure loss the suction air stream suffers when passing the filter element during buildup of the coating. This pressure loss is an indirect measure of how far the coating process has progressed, or of whether one has produced a fibrous coating with sufficient filtering efficiency for the case in question.

One can apply an antistatic coating, preferably consisting of carbon black particles, to the afflux surface of the supporting body before the fibers are applied. The antistatic particles can be applied in particular as a dispersion or suspension. For bonding the antistatic particles the same holds as was said for bonding the fibers.

It is pointed out that the inventive methods described can serve chiefly for producing inventive filter elements as described above, on the one hand, but also for producing other fibrous coatings on filter element supporting bodies.

The inventive filter elements are intended primarily for fine filtering of gases and air, in particular when dedusting air in manufacturing shops on production machines and during method steps, but they can also be used for filtering liquids. If suitable materials are chosen one can also filter hot gases, such as combustion off-gases, and hot liquids.

With the inventive filter element typical average pore sizes of the supporting body are in the range of 10 to 100 microns, typical fiber diameters in the range of 0.5 to 8 microns. It is pointed out that the inventive buildup of the fibrous coating makes it possible to work with a comparatively large average pore size of the supporting body, because the open pores of the supporting body can be reliably bridged on the afflux surface, while at the same time the coating can be formed with a very fine pore size, as outlined at the outset. Consequently one can use supporting bodies with very low flow resistance. One can easily produce inventive filter elements which, as required, almost completely filter out foreign matter particles with a size of over 5 microns, preferably foreign matter particles with a size over 2 microns, most preferably foreign matter particles with a size over 0.5 microns.

It is pointed out that the first aspect of the invention described above and the second aspect of the invention described above can be combined with each other. Furthermore it is pointed out that the method according to claim 11 can, but need not, be combined with the method according to claim 8 or the method according to claim 9.

The invention will be explained more closely in the following with reference to an embodiment example schematically shown in the drawing, in which.

Figure 1:
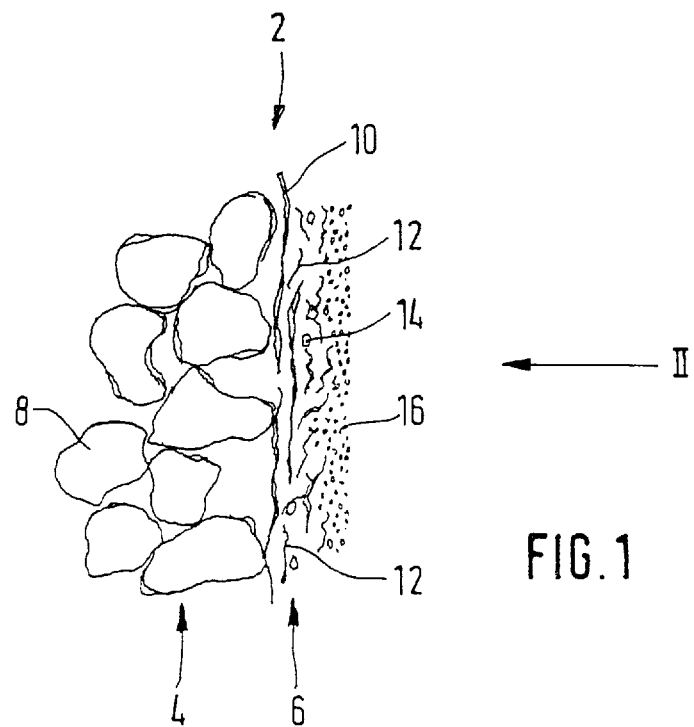
FIG. 1 shows a detail of a filter element in cross section, the cutting plane being at right angles to the afflux surface of the filter element.

Schematically shown filter element 2 comprises supporting body 4 provided with fibrous coating 6 on its afflux surface for fluid to be filtered which is on the right in FIG. 1. Supporting body 4 consists of polyethylene particles 8 which are sintered together, resulting in porous supporting body 4 with an average pore size of e.g. 30 microns. One can work in the way known in the art by intermixing ultrahigh-molecular polyethylene particles and medium-molecular polyethylene particles to produce supporting body 4. In the sintering process the lower-molecular polyethylene particles begin to melt to a higher degree and form a connecting skeleton for high-molecular polyethylene particles 8, which also connect with each other through the sintering process.

Fibrous coating 6 has first fibers 10 whose length is considerably greater than the average pore size of supporting body 4. With this length first fibers 10 bridge the open pores of supporting body 4 on its afflux side. Furthermore, schematically shown second fibers 12 of considerably smaller length are present which fill the free spaces between first fibers 10 and form a fibrous coating layer whose thickness depends on the intended filtering function of filter element 2. Fibers 10, 12 are bound together and to outer polyethylene particles 8 on the afflux side by means of an adhesive, which is not representable graphically because of its small volume in the finished filter element state. To mention only one of many examples, one can use the commercially available adhesive MOWILITH (registered trademark of Hoechst AG), an aqueous copolymer dispersion of vinyl acetate, ethylene and vinyl chloride. The suspension to be applied to supporting body 4 can have the following composition:

20% by weight fibers or particles

6% by weight MOWILITH

74% by weight water

In fibrous coating 6 relatively few fine-grained particles 14 are distributed.

A coating layer consisting of fine-grained particles 16, e.g. rock dust, is applied on the outside to fibrous coating 6. Particles 16 are likewise bound together and to fibrous coating 6 with adhesive.

If fibers 10, 12 and/or particles 16 are applied dispersed or suspended in a liquid, one preferably uses a dispersion adhesive, which is also incorporated into this liquid.

Figure 2:
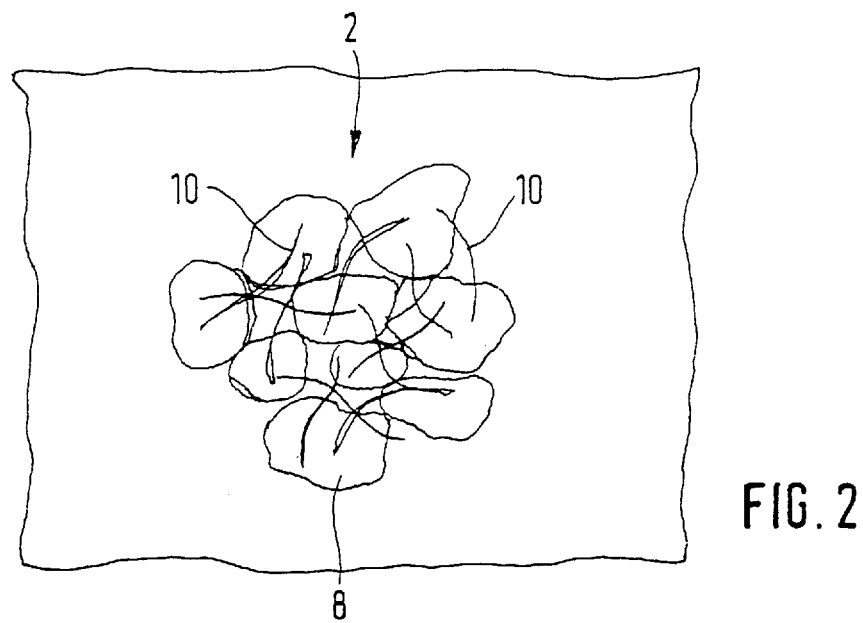
FIG. 2 shows a plan view of a part of the filter element of FIG. 1, regarded in the viewing direction of arrow II, indicating a state with first fibers applied but before application of the second fibers and a particle coating layer.

FIG. 2 shows a fibrous coating state of filter element after application of first fibers 10 but before application of second fibers 12. When second fibers 12 are subsequently applied, they fill the spaces visible in FIG. 2 between first fibers 10 and form fibrous coating layer 6 shown FIG. 1.

If a coating layer consisting of fine-grained particles 16 is present it is unnecessary for fibrous coating 6 to consist of first fibers 10 and second fibers 12.

I claim:

1. A filter element (2) having an inherently stable, porous supporting body (4) and, on its afflux surface for fluid to be filtered, a fibrous coating (6) of the supporting body (4) which is finer-pored than the supporting body (4), the fibrous coating (6) being bound to the supporting body (4) in part by a fiber/fiber bond and in part by a fiber/supporting body bond, characterized in that the fibrous coating (6) has first fibers (10) whose length is grater than the average pore size of the supporting body (4), and second fibers (12) whose length is clearly smaller than the length of the first fibers (10) to create the fine porosity of the fibrous coating (6).

2. The filter element of claim 1, characterized in that the first fibers (10) are applied as a first fibrous coating layer and the second fibers (12) are applied thereto as a second fibrous coating layer.

3. The filter element of claim 2, characterized in that a plurality of fibrous coating layers are applied with the fineness of porosity increasing away from the supporting body (4).

4. The filter element of claim 2, characterized in that the fiber/fiber bond and the fiber/supporting body bond are effected by adhesive.

5. The filter element of claim 2, characterized in that a coating layer consisting of fine-grained particles (16) is applied on the outside to the fibrous coating (6).

6. The filter element of claim 2, characterized in that the supporting body (4) is built up from sintered plastic particles (8).

7. The filter element of claim 1, characterized in that a plurality of fibrous coating layers are applied with the fineness of porosity increasing away from the supporting body (4).

8. The filter element of claim 1, characterized in that the fiber/fiber bond and the fiber/supporting body bond are effected by adhesive.

9. The filter element of claim 1, characterized in that a coating layer consisting of fine-grained particles (16) is applied on the outside to the fibrous coating (6).

10. The filter element of claim 1, characterized in that the supporting body (4) is built up from sintered plastic particles (8).

* * * * *